(12) United States Patent
Rigney et al.

(10) Patent No.: US 6,514,629 B1
(45) Date of Patent: Feb. 4, 2003

(54) ARTICLE WITH HAFNIUM-SILICON-MODIFIED PLATINUM-ALUMINUM BOND OR ENVIRONMENTAL COATING

(75) Inventors: Joseph D. Rigney, Milford, OH (US); Ramgopal Darolia, West Chester, OH (US); William S. Walston, Maineville, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/210,855

(22) Filed: Dec. 15, 1998

(51) Int. Cl.[7] .............................. B32B 15/04; F03B 3/12
(52) U.S. Cl. ...................... 428/632; 428/654; 428/652; 428/670; 428/680; 428/941; 416/241 R
(58) Field of Search .................. 428/610, 623, 428/633, 652, 653, 670, 680, 941, 632, 654; 416/241 R, 241 B

(56) References Cited

U.S. PATENT DOCUMENTS

| 4,447,503 A | 5/1984 | Dardi et al. |
| 4,615,864 A | 10/1986 | Dardi et al. |
| 5,514,482 A | 5/1996 | Strangman |
| 5,658,614 A * | 8/1997 | Basta et al. .................. 427/253 |
| 5,716,720 A * | 2/1998 | Murphy ...................... 428/623 |
| 5,856,027 A * | 1/1999 | Murphy ...................... 428/623 |
| 5,989,733 A | 11/1999 | Warnes et al. |

FOREIGN PATENT DOCUMENTS

EP            0821078 A1     1/1998

* cited by examiner

*Primary Examiner*—Deborah Jones
*Assistant Examiner*—Jennifer McNeil
(74) *Attorney, Agent, or Firm*—David L. Narciso; Gregory O. Garmong

(57) ABSTRACT

An article such as a gas turbine blade or vane has a superalloy substrate, and a coating system deposited on the substrate. The coating system includes a protective layer overlying the substrate, and, optionally, a ceramic thermal barrier coating layer overlying the bond coat. The protective layer has an uppermost layer with a composition including platinum, aluminum, and, in atom percent, from about 0.14 to about 2.8 percent hafnium and from about 2.7 to about 7.0 percent silicon, with the atomic ratio of silicon:hafnium being from about 1.7:1 to about 5.6:1.

13 Claims, 4 Drawing Sheets

ARTICLE WITH HAFNIUM-SILICON-MODIFIED PLATINUM-ALUMINUM BOND OR ENVIRONMENTAL COATING

The invention herein described was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

This invention relates to metallic articles having a coating system thereon to permit use at elevated temperatures and, more particularly, to a modified platinum-aluminum coating that may serve as an environmental coating or as the bond coating in a thermal barrier coating system.

In an aircraft gas turbine (jet) engine, air is drawn into the front of the engine, compressed by a shaft-mounted compressor, and mixed with fuel. The mixture is combusted, and the resulting hot exhaust gases are passed through a turbine mounted on the same shaft. The flow of gas turns the turbine, which turns the shaft and provides power to the compressor. The hot exhaust gases flow from the back of the engine, driving it and the aircraft forwardly.

The hotter the exhaust gases, the more efficient is the operation of the jet engine. There is thus an incentive to raise the exhaust gas temperature. However, the maximum temperature of the exhaust gases is normally limited by the materials used to fabricate the turbine vanes and turbine blades of the turbine. In current engines, the turbine vanes and blades are made of nickel-based superalloys and can operate at temperatures of up to 1900–2100° F.

Many approaches have been used to increase the operating temperature limit of the turbine blades and vanes. The compositions and processing of the materials themselves have been improved. Physical cooling techniques are used. In one widely used approach, internal cooling channels are provided within the components, and cool air is forced through the channels during engine operation.

In another approach, a protective environmental coating or a ceramic/metal thermal barrier coating (TBC) system is applied to the turbine blade or turbine vane component, which acts as a substrate. The protective environmental coating is useful in intermediate-temperature applications. One known type of metallic protective coating is a platinum-aluminum coating that is formed by depositing platinum and aluminum onto the surface of the substrate, and interdiffusing these constituents.

A ceramic thermal barrier coating may be applied overlying the platinum-aluminum coating to form a thermal barrier coating system. The thermal barrier coating system is useful in higher temperature applications. The ceramic thermal barrier coating insulates the component from the exhaust gas, permitting the exhaust gas to be hotter than would otherwise be possible with the particular material and fabrication process of the component. However, ceramic layers usually do not adhere well directly to the nickel-base superalloys used in the substrates. To improve ceramic coating adhesion and provide oxidation resistance to the substrate in case of ceramic spallation, a bond coating is applied to the substrate. (Bond coats are also sometimes termed diffusion aluminides or overlay coatings.) Platinum aluminides, the focus of the present invention, are one example of a diffusion aluminide. The platinum-aluminum bond coat is placed between the substrate and the ceramic thermal barrier coating to effect the adhesion of the ceramic layer to the substrate. In addition, the upper surface of the bond coat oxidizes to a protective aluminum oxide scale to inhibit further oxidation of the substrate.

Although superalloys coated with such environmental coatings and ceramic/metal thermal barrier coating systems do provide substantially improved performance over uncoated materials, there remains an opportunity for improvement in elevated temperature performance and environmental resistance. There is an ongoing need for improved environmental coatings and bond coats to protect nickel-base superalloys in elevated-temperature applications. This need has become more acute with the development of the newest generation of nickel-base superalloys, inasmuch as the older protective coatings are often not satisfactory with these materials and higher temperature performance requirements. The present invention fulfills this need, and further provides related advantages.

SUMMARY OF THE INVENTION

The present invention provides a articles with an environmental coating or a thermal barrier coating (TBC) system and methods for their preparation. The articles have improved service life at elevated temperature as a result of reduced degradation through spallation and consequent loss of the coating. The functionality of the thermal barrier coating system to insulate and protect the substrate is retained for longer exposure to elevated temperature and greater numbers of thermal cycles.

In accordance with the invention, an article comprises a substrate, and coating system deposited on the substrate. The thermal barrier coating system includes a protective layer overlying the substrate and, optionally, a ceramic thermal barrier coating layer overlying the protective layer. The protective layer has a composition comprising platinum and aluminum, plus, in atomic percent, from about 0.14 to about 2.8 percent hafnium and from about 2.7 to about 7.0 percent silicon. The atomic ratio of silicon:hafnium is desirably from about 1.7:1 to about 5.6:1. The hafnium and silicon compositions are average values measured through an additive layer, as will be described subsequently. The aluminum content of the protective layer is any operable amount, preferably from about 30 to about 60 atomic percent, most preferably from about 30 to about 50 atomic percent. The platinum content is any operable amount, preferably from about 4 to about 15 atomic percent, most preferably from about 4 to about 13 atomic percent. The balance of the protective layer is elements diffused into the layer from the substrate, such as nickel, cobalt, chromium, tungsten, etc.

A preferred method to prepare the article includes the steps of providing a substrate, depositing layers containing the platinum, aluminum, hafnium, and silicon, and heating the layers so that the aluminum, hafnium, and silicon diffuse into the layer of platinum to form a protective layer. An additive layer portion of the protective layer has an average composition as set forth above. If a thermal barrier coating system is desired, a ceramic thermal barrier coating layer is deposited overlying the protective layer, either after the diff-using is complete or simultaneously with the interdiffusing step.

The coating system of the invention exhibits increased service life as a result of improved resistance to degradation by spallation. When the platinum aluminide layer is exposed to elevated temperatures, its surface oxidizes to form an aluminum oxide layer. The principal failure mode is the spalling of the aluminum oxide layer as a result of the formation of cracks in the aluminum oxide or at the aluminum oxide/platinum aluminide interface. The presence of the indicated additions of silicon and hafnium inhibits this failure mode, reducing the incidence of cracking in the aluminum oxide and at the aluminum oxide/platinum aluminide interface. The coating system modified with the addition of silicon and hafnium in the indicated amounts remains functional for a longer period in service conditions than does the unmodified protective layer.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIGS. 2A–B are schematic enlarged sectional views of the article of FIG. 1, taken on line 2—2, illustrating coating systems on the surface of the article, wherein FIG. 2A illustrates an environmental coating and FIG. 2B illustrates a thermal barrier coating system;

DETAILED DESCRIPTION OF THE INVENTION

Figure 1:
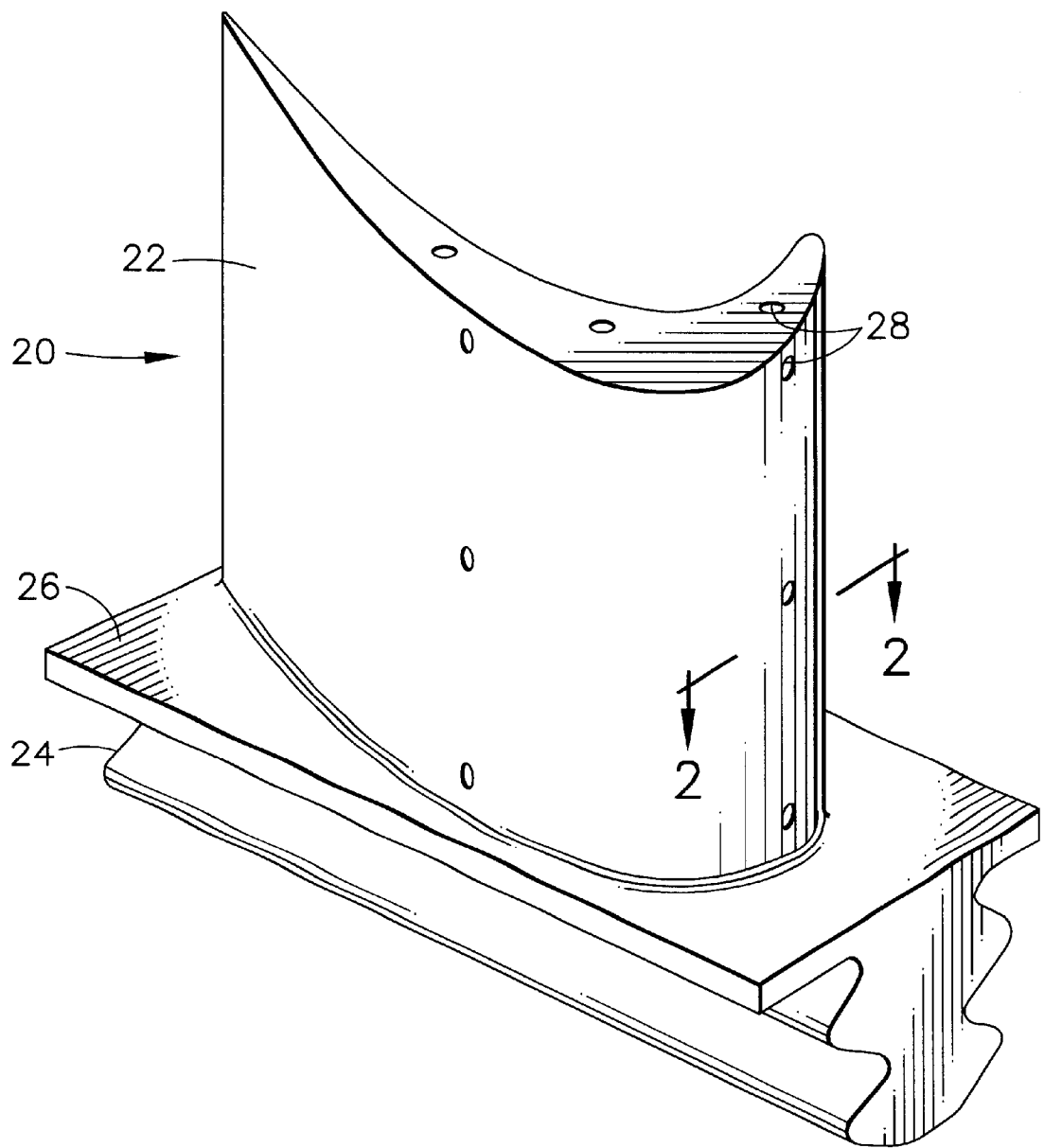
FIG. 1 is a perspective view of a turbine blade.

FIG. 1 depicts a component article of a gas turbine engine such as a turbine blade or turbine vane, and in this illustration a turbine blade 20. The turbine blade 20 includes an airfoil 22 against which the flow of hot exhaust gas is directed. The turbine blade 20 is mounted to a turbine disk (not shown) by a dovetail 24 which extends downwardly from the airfoil 22 and engages a slot on the turbine disk. A platform 26 extends longitudinally outwardly from the area where the airfoil 22 is joined to the dovetail 24. In some articles, a number of cooling channels extend through the interior of the airfoil 22, ending in openings 28 in the surface of the airfoil 22. A flow of cooling air is directed through the cooling channels, to reduce the temperature of the airfoil 22.

Figure 2A:
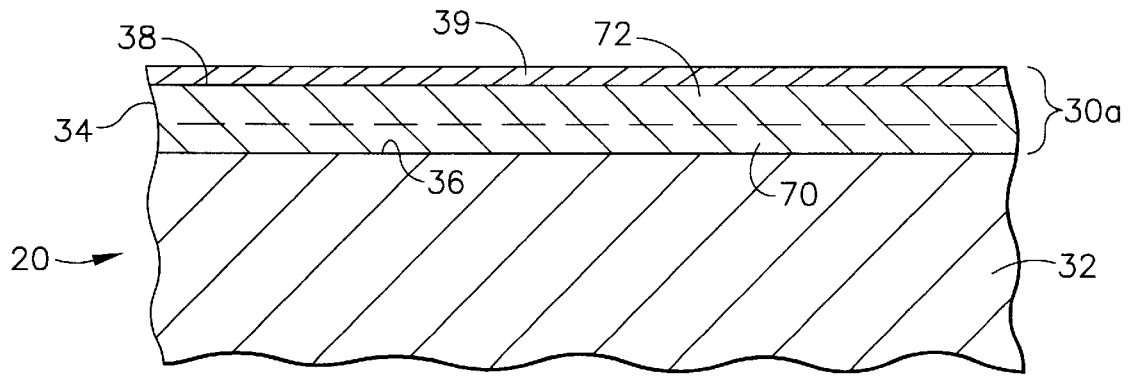
Figure 2B:
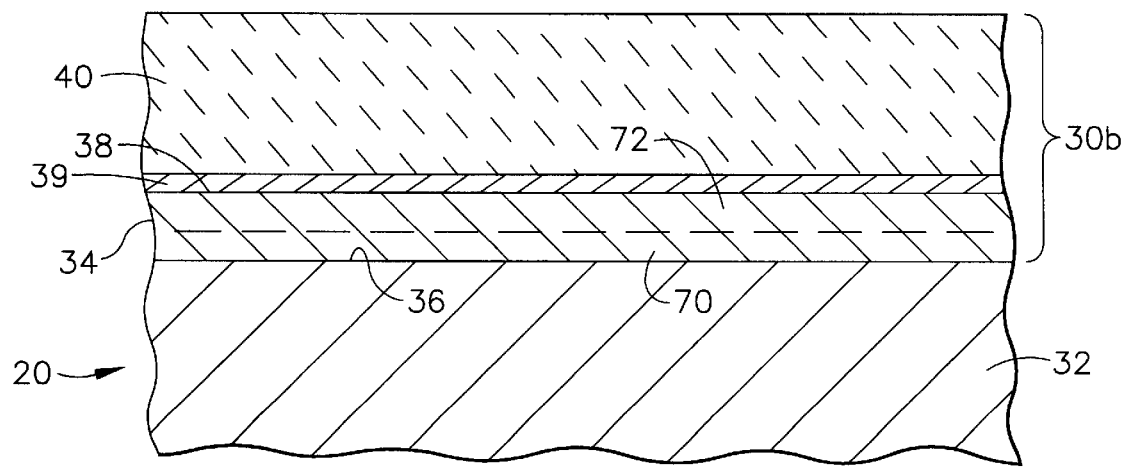

FIGS. 2A–B illustrate coating systems 30 deposited upon the turbine blade 20, which thereby acts as a substrate 32. In FIG. 2A, an environmental coating system 30a includes a protective layer, and in FIG. 2B, a thermal barrier coating system 30b includes a protective layer, and also a ceramic thermal barrier coating layer overlying the protective layer.

In each case, the substrate 32 may be formed of any operable material, but a preferred base metal from which the article substrate is formed is a nickel-base superalloy. A preferred superalloy is Rene' N5, which has a nominal composition in weight percent of 7.5 percent cobalt, 7 percent chromium, 6.2 percent aluminum, 6.5 percent tantalum, 5 percent tungsten, 1.5 percent molybdenum, 3 percent rhenium, balance nickel. Other operable superalloys include, for example, Rene' N6 and Rene' 142.

The coating system 30 includes a composition-modified platinum-aluminum protective layer 34 overlying and contacting a surface 36 of the substrate 32. In the coating system 30a, the protective layer 34 is termed an "environmental coating", and in the coating system 30b, the protective layer 34 is termed a "bond coat". The term "protective layer" as used herein encompasses both environmental coatings (having no overlying ceramic thermal barrier coating) and bond coats (having an overlying ceramic thermal barrier coating). The protective layer 34 is preferably from about 0.0005 to about 0.004 inches in thickness, but lesser or greater thicknesses are operable although less desirable. In each of the coating systems 30a and 30b, a topmost surface 38 of the protective layer 34 oxidizes during fabrication and/or during service to form a thin aluminum oxide layer 39.

The platinum-aluminum layer 34 may have any of a range of platinum and aluminum contents. In a preferred embodiment, the platinum is present in an average amount of from about 4 to about 15 atomic percent, preferably about 4 to about 13 atomic percent, of the protective layer 34, and the aluminum is present in an average amount of from about 30 to about 60 atomic percent, preferably about 30 to about 50 atomic percent, of the protective layer 34. The composition-modified platinumaluminum protective layer 34 is typically not chemically homogeneous. This inhomogeneous composition profile results from the manner of preparation of the composition-modified platinum-aluminum protective layer 34, as will be discussed subsequently. Accordingly, for all elemental compositions set forth herein, average composition values are used, calculated in a manner to be described subsequently.

The composition of the platinum aluminum protective layer 34 is modified by the addition of hafnium and silicon. The hafnium is present in an average amount of from about 0.14 atom percent to about 2.8 atom percent, and the silicon is present in an average amount of from about 2.7 atom percent to about 7.0 atom percent. The atom ratio of the average amounts of silicon to hafnium is preferably from about 1.7:1 to about 5.6:1.

The presence of the hafnium and silicon contribute to a reduction in the spallation failure incidence of the aluminum oxide layer 39, and thence the entire coating system. Stated alternatively, the spallation lifetime of the coating is lengthened by the hafnium and silicon additions within the stated limits. Spallation occurs when the coating is thermally cycled between low temperature and high temperature, as occurs during service cycles of a gas turbine engine. Cracks typically form in the aluminum oxide layer 39 or at the interface 38 between the aluminum oxide layer 39 and the protective layer 34. The cracks propagate parallel to the substrate surface so that pieces of the aluminum oxide layer 39 and the thermal barrier coating layer, where present, flake away. As a result of the loss of the overlying layers, the protective layer 34 and thence the underlying substrate are exposed to the hot exhaust gases of the engine, and the substrate quickly pits and fails. If the amounts and ratios of hafnium and silicon are within the stated ranges, the spallation failure is inhibited and the life of the coating is lengthened. If the amounts and ratios of hafnium and silicon are outside the stated ranges, the spallation failure is not substantially inhibited.

The coating system 30 may also include a ceramic thermal barrier coating layer 40 deposited upon the composition-modified platinum aluminum protective layer 34, as illustrated in FIG. 2B. However, the present invention is operable in the absence of such a coating layer 40, as illustrated in FIG. 2A. The ceramic thermal barrier coating layer 40, where present, is preferably from about 0.004 inches to about 0.030 inches thick, most preferably from about 0.005 to about 0.015 inches thick. (FIGS. 2A–B are not drawn to scale.) The ceramic thermal barrier coating layer 40 is operable in thicknesses outside this range, but is less desirable. Lesser thicknesses of the ceramic thermal barrier coating layer 40 tend to give insufficient insulation to the substrate 32. Greater thicknesses of the ceramic thermal barrier coating layer 40 tend to add unnecessary weight to the article. The ceramic thermal barrier coating layer 40 is preferably yttria-(partially) stabilized zirconia, which is a zirconium oxide-base ceramic material containing from about 4 to about 8 weight percent of yttrium oxide. Other operable stabilizing oxides and ceramic base materials may be used as well.

Thermal barrier protective systems of this general type are known in the art, except that the virtues of the indicated hafnium and silicon modifications to the protective layer 34 were not recognized. U.S. Pat. No. 5,514,482 has suggested an addition to diffusion aluminides of an unspecified amount of platinum, silicon, and hafnium, and/or other elements to bond coats. Such additions may not improve the properties of the thermal barrier coating system, when they do not fall within the limits set forth herein, and in fact may be harmful.

Figure 3:
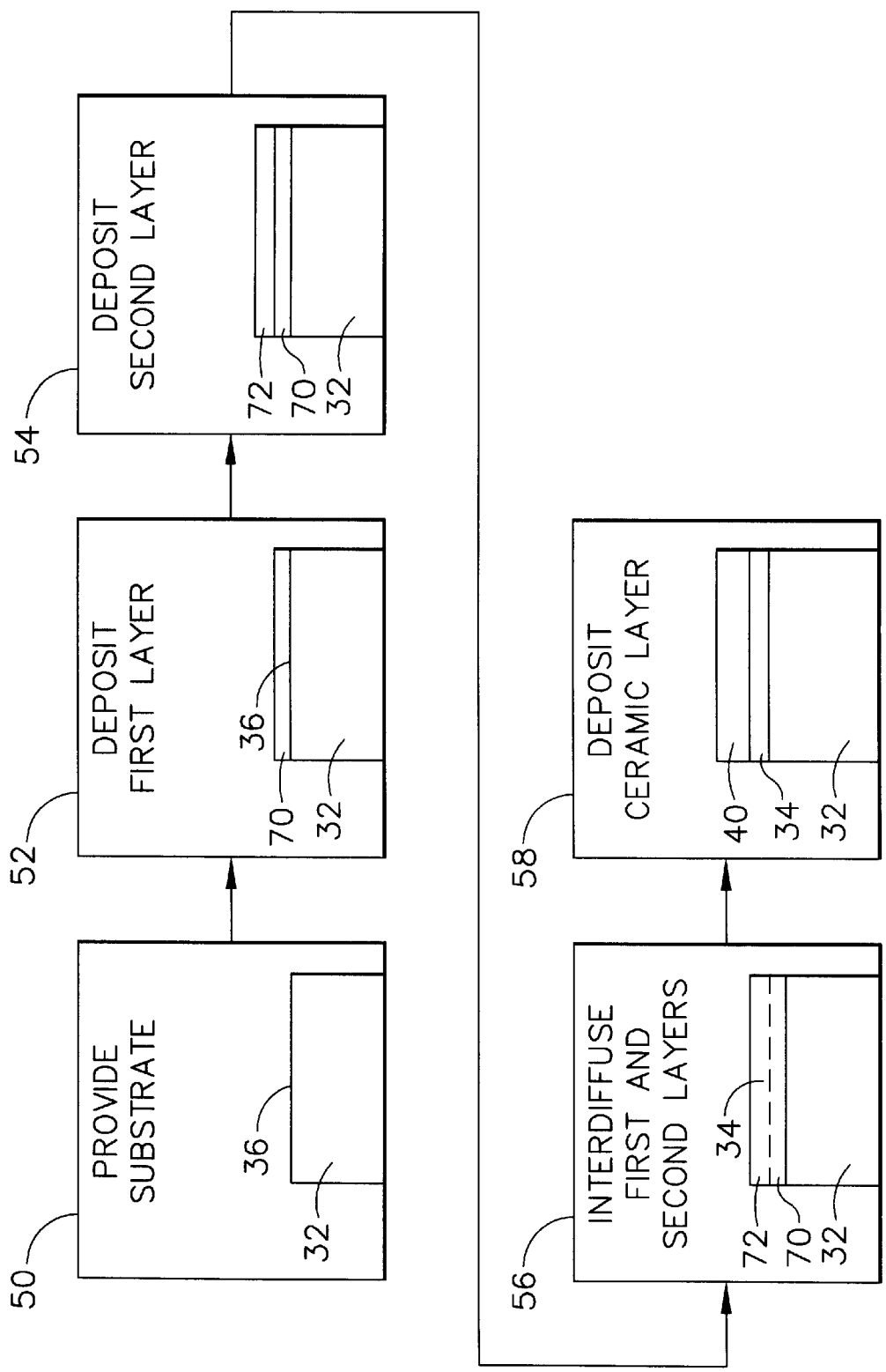
FIG. 3 is a pictorial block diagram of a preferred embodiment of the approach of the invention.

FIG. 3 illustrates in pictorial block-diagram form a preferred approach for practicing the present invention. The substrate 32 is provided, numeral 50. The substrate 32 is in the general shape and of substantially the same size as the desired final article, such as the turbine blade 20, but it may be slightly smaller in dimensions to account for the presence of the coating system 30. The substrate 32 is of any operable composition, but is preferably a nickel-base superalloy and most preferably the Rene' N5 superalloy whose nominal composition was set forth above.

The platinum, aluminum, hafnium, and silicon are deposited, either individually or by co-deposition, upon the surface of the substrate 32 as layers and interdiffused. A number of approaches for depositing and interdiffusing the elements may be used. Such approaches include, for example, (1) depositing platinum onto the surface of the substrate as a layer, interdiffusing the platinum into the substrate, depositing the aluminum, hafnium, and silicon as another layer, and thereafter interdiffusing that layer with the previously diffused platinum layer; (2) depositing platinum onto the surface of the substrate as a layer, depositing the aluminum, hafnium, and silicon as another layer, and thereafter interdiffusing the two layers; (3) depositing platinum, hafnium, and silicon as a layer, and applying aluminum as an overlying second layer, all at high temperature to achieve interdiffusion. An interdiffusion step may also be included in this third approach after depositing platinum, hafnium, and silicon, and prior to depositing aluminum. Aluminum, hafnium, and silicon may be deposited in the coating step. (4) physical vapor deposition by electron-beam evaporation or sputtering of PtAlHfSi alloys; and (5) plasma spray deposition of powders comprising the Hf/Si-containing PtAl materials. For the present purposes, these and other approaches for depositing the elements are equivalent, in that they produce the layer 34 of the desired compositions.

Of these approaches, the presently most preferred approach, identified as number 2 in the previously paragraph, will be described in detail.

A first layer 70 comprising platinum, preferably pure platinum, is deposited on the surface 36 of the substrate 32 as it then is presented, numeral 52. The first layer 70 of platinum is preferably deposited by electroplating, such as from a $Pt(NH_3)_4HPO_4$ solution. Other techniques such as chemical vapor deposition and physical vapor deposition may also be used. The first layer 70 comprising platinum is preferably about 5 micrometers thick. A second layer 72, sometimes termed the "additive layer", comprising aluminum, hafnium, and silicon is thereafter deposited overlying and contacting the first layer 70, numeral 54. The second layer 72 is deposited by any operable approach, with chemical vapor deposition (CVD) preferred. In that approach, a hydrogen halide gas, such as hydrogen chloride, is contacted with aluminum metal or an aluminum alloy to form the corresponding aluminum halide gas. Hafnium and silicon are doped into the aluminum halide gas by adding hafnium halide and silicon halide gases. The aluminum/hafnium/silicon-containing source gas is contacted to the previously deposited first layer 70 overlying the substrate 32, depositing the aluminum, hafnium, silicon-containing second layer 72 over the first layer 70. The reactions occur at elevated temperature such as from about 1925° F. to about 1975° F. so that deposited aluminum, hafnium, and silicon atoms interdiffuse into the first layer 70 during a 4 to 20 hour cycle.

The second layer 72 is illustrated as distinct from the first layer 70 in FIGS. 2 and 3. The composition averaging for hafnium, silicon, aluminum, and platinum discussed herein is performed over the second, additive, layer 72 and specifically excludes the interdiffusion zone 70 between the second layer 72 and the substrate 32. The boundaries of the second layer 72 are visible after appropriate transverse sectioning and etching of the structure, a well-established metallurgical practice, both before and after interdiffusing has occurred. Therefore, to determine average compositions as specified herein, the extent of the second layer 72 is first determined by sectioning and etching the structure, to expose a view like that of FIGS. 2A and 2B. Etching may be accomplished, for example, by a suitable chemical etch. A number of compositional measurements of the hafnium, silicon, aluminum, and/or platinum are made over a range of depths on the exposed face of the second ("additive") layer 72 using an appropriate microanalytical technique, such as an electron microprobe. The second or additive layer 72 is the uppermost layer of the protective layer 34. The measurements are averaged to obtain the average value in the second layer 72 for the element being determined. The average numerical value is compared with the compositional limits set forth herein. (For other deposition techniques such as those discussed above, the composition averaging is performed over the second deposited layer, if two layers are deposited, or over the single layer if only a single layer is deposited. In each case, the averaging is performed over the uppermost layer of the protective layer 34.)

The first layer 70, the second layer 72, and the substrate 32 are heated to an elevated temperature to further interdiffuse the first layer and the second layer, numeral 56. The heating is preferably accomplished at a temperature of from about 1925° F. to about 1975° F., and for a time of from about 4 hours to about 20 hours. The result is the interdiffused composition-modified platinum-aluminum layer 34, as illustrated in FIG. 2. The heating and interdiffusion step 56 may be conducted simultaneously with the deposition step 54, or after the deposition step 54, or both, by continuing the heating of the step 54 after completion of deposition of the second layer 72. The compositional averaging may be performed at any time prior to the completion of this step.

The ceramic layer 40 is thereafter optionally deposited, numeral 58, to form the thermal barrier coating system as illustrated in FIG. 2B. The ceramic coating 40 may be applied by any operable technique, with electron beam physical vapor deposition (EBPVD) being preferred for the preferred yttria-stabilized zirconia coating. The EBPVD processing may be preceded and/or followed by high-temperature processes that may affect the distribution of elements in the bond coat. The EBPVD process itself is typically conducted at elevated temperatures. The composition of the additive layer 72 may also be examined after these additional heat treatments.

Test specimens were prepared using the preferred approach described above to produce the thermal barrier coating system of FIG. 2B, using test buttons of the Rene'N5 substrate material. Small sections of the as-bond-coated substrates were removed from the test samples prior to coating with the ceramic layer 40 and testing in order to link the pre-test chemistry with the test performance. The specimens were evaluated for spallation life by either a furnace thermal cycling test or a burner rig test. In the thermal cycling test, the specimens were heated in a furnace to a test temperature of 2075° F. in a one-hour cycle of 15 minutes heating from room temperature and cooling to room temperature, with an intermediate hold of 45 minutes at the test temperature. The burner rig test was conducted at 2150° F. for 2 hours hold time cycles with a gas velocity of 0.5 mach, with intermediate cooling to room temperature and reheating. After failure, which is defined as 20 percent spallation of the sample area in the furnace test or 1 square centimeter of spallation in the burner rig test, spalled and non-spalled areas of the tested samples were matched with matching locations on the sections removed prior to test. These sections were chemically analyzed by electron microprobe, and studied metallographically.

Figure 4A:
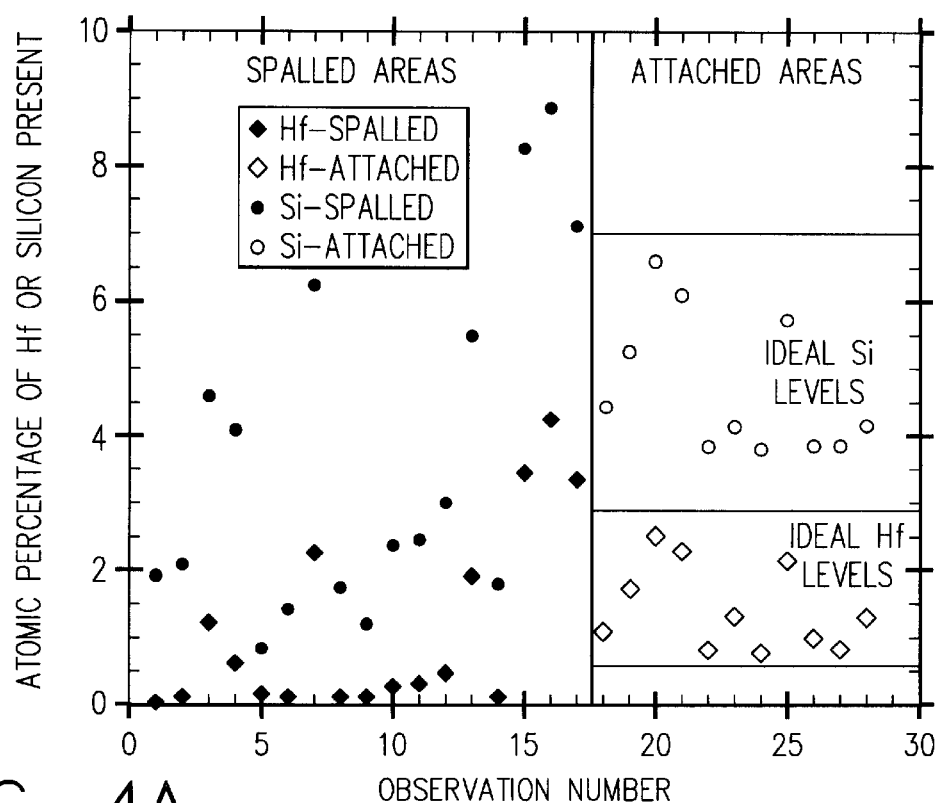
FIGS. 4A–B are graphical summaries of test results for failed and unfailed specimens, wherein FIG. 4A reports hafnium and silicon contents, and FIG. 4B reports the ratio of silicon to hafnium.
Figure 4B:
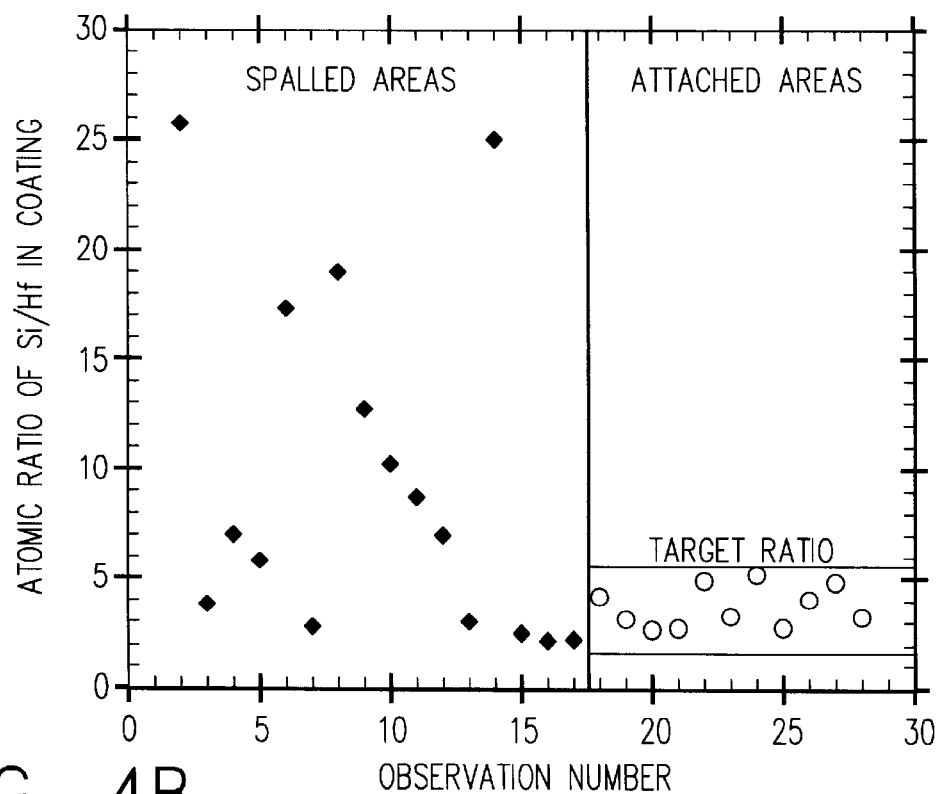

The metallographic tests indicated that the unfailed locations had a unique hafnium/silicon phase presence which aided in adherence of the thermal barrier coating to the substrate. FIGS. 4A–B summarize the electron microprobe chemical test results for the spalled areas and the unspalled areas wherein the thermal barrier coating remained attached to the substrate. These results establish the hafnium content, silicon content, and silicon:hafnium ratio values set forth herein as the limits for these values. To establish the values, the chemistry data were separated according to whether the area analyzed had failed or not failed. The data from the failed areas was further subdivided into elemental contents below the average determined from the unfailed areas and elemental contents above the average. Single factor variance analysis, conveniently performed by the ANOVA computer procedure, was used to compare the data sets. Based on the statistical analysis, the chemistries of the unfailed areas were statistically different from those of the failed regions with either too low or too high of the elemental content, for each element and ratio. The selected chemistries were those within two standard deviations above and below the average value for the unfailed regions.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An article, comprising:
    a substrate; and
    a coating system deposited on the substrate, the coating system including
        a protective layer overlying the substrate, the protective layer including an uppermost layer having a composition comprising platinum and aluminum, plus, in atomic percent, on average from about 0.14 to about 2.8 percent hafnium and from about 2.7 to about 7.0 percent silicon.

2. The article of claim 1, wherein the substrate is formed in the shape of a gas turbine component.

3. The article of claim 1, wherein the substrate is formed in the shape of a gas turbine blade.

4. The article of claim 1, wherein the substrate is formed in the shape of a gas turbine vane.

5. The article of claim 1, wherein the substrate is a nickel-base superalloy.

6. The article of claim 1, wherein the protective layer has a composition of from about 4 to about 15 atom percent platinum, and from about 30 to about 60 atom percent aluminum.

7. The article of claim 1, wherein the protective layer is from about 0.0005 to about 0.004 inch thick.

8. The article of claim 1, further including
    a ceramic thermal barrier coating layer overlying the protective layer.

9. The article of claim 8, wherein the thermal barrier coating layer comprises yttria-stabilized zirconia.

10. The article of claim 8, wherein the thermal barrier coating layer has a thickness of from about 0.004 inches to about 0.030 inches.

11. The article of claim 1, wherein the atomic ratio silicon:hafnium is from about 1.7:1 to about 5.6:1.

12. The article of claim 1, further including
    a ceramic thermal barrier coating layer overlying the protective layer.

13. An article, comprising:
    a substrate formed in the shape of a gas turbine component; and
    a coating system deposited on the substrate, the coating system including
        a protective layer overlying the substrate, the protective layer including an uppermost layer having a composition comprising platinum and aluminum, plus, in atomic percent, on average from about 0.14 to about 2.8 percent hafnium and from about 2.7 to about 7.0 percent silicon, wherein the atomic ratio silicon:hafium is from about 1.7:1 to about 5.6:1.

* * * * *